United States Patent
Thompson et al.

[11] Patent Number: 6,025,930
[45] Date of Patent: Feb. 15, 2000

[54] MULTICELL CLUSTERED MASK WITH BLUE NOISE ADJUSTMENTS

[75] Inventors: Gerhard Robert Thompson, Wappingers Falls; Charles Philippe Tresser, Mamaroneck; Chai Wah Wu, Ossining, all of N.Y.

[73] Assignee: International Business Machines Corporation, Armonk, N.Y.

[21] Appl. No.: 08/909,535

[22] Filed: Aug. 12, 1997

[51] Int. Cl.$^7$ .......................... G06K 15/02; H04N 1/405
[52] U.S. Cl. ...................... 358/1.9; 382/237; 382/270; 358/457; 358/466; 358/298
[58] Field of Search .......................... 395/109; 382/237, 382/270; 358/456, 457, 458, 466, 298, 534, 535

[56] References Cited

U.S. PATENT DOCUMENTS

| 5,111,310 | 5/1992 | Parker et al. | 358/456 |
| 5,341,228 | 8/1994 | Parker et al. | 358/534 |

OTHER PUBLICATIONS

Robert Ulichney, "The void–and–cluster method for dither array generation", Digital Equipment Corporation, SPIE vol. 1913, pp. 332–343, Sep. 1993.

Meng Yao et al., "Modified approach to the construction of a blue noise mask", Journal of Electronic Imaging 3 (1), pp. 92–97, Jan. 1994.

Robert A. Ulichney, "Dithering with Blue Noise", Proceeding of the IEEE, vol. 76, No. 1, pp. 57–79, Jan. 1988.

*Primary Examiner*—Scott Rogers
*Attorney, Agent, or Firm*—Whitham, Curtis & Whitham; Stephen C. Kaufman

[57] ABSTRACT

A technique which combines the advantages of blue noise and clustering obtains more pleasant "blueish" effects in the rendering of the grey levels for which the original multicell mask generates unwanted periodic representations. Such original multicell clustered dither array patterns which are undesirable are replaced by less periodic ones while preserving all benefits of the classical methods, and in particular, leaving the nicest patterns unchanged. An automated process redistributes the locations of the threshold values corresponding to undesirable grey levels to obtain more pleasant "blueish" effects in the rendering of the grey levels.

15 Claims, 4 Drawing Sheets

MULTICELL CLUSTERED MASK WITH BLUE NOISE ADJUSTMENTS

BACKGROUND OF THE INVENTION

1. Field of the Invention

The present invention generally relates to digital halftoning as applied to laser printers or xerographic printers and, more particularly, to a method to correct and/or adjust the undesirable patterns generated by multicell clustered dither threshold arrays by using aperiodicity to increment from one acceptable pattern to the next.

2. Background Description

Most printers today can print in only a limited number of colors. Digital halftoning is a technique for printing a picture (or more generally displaying it on some two-dimensional medium) using small dots of a limited number of colors such that it appears to consist of many colors when viewed from a proper distance. For example, a picture of black and white dots can appear to display grey levels when viewed from some distance.

The fastest and most commonly used methods for digital halftoning are dithering algorithms which use threshold arrays. The original forms of these arrays used periodic patterns of threshold values which can have an unpleasant rendering at certain gray levels. The method described here can eliminate or reduce unpleasant patterns by introducing blue noise generated via a potential method in the determination of threshold locations for these intermediate patterns.

Too much randomness in the design of a dither array blurs the image and yields unesthetic results. Based on the discovery that blue noise, or noise with the low frequencies attenuated, gives the best visual effect, as described for instance by R. Ulichney in "Dithering with blue noise", Proc. IEEE, 76, No. 1 (1988), pp. 56–79, methods to construct dithering masks with blue noise were proposed for instance in U.S. Pat. No. 5,111,310 to K. J. Parker and T. Mitsa, by M. Yao and K. J. Parker in "Modified approach to the construction of a blue noise mask", J. of Eledtronic Imaging, 3, No.1 (1994), pp. 92–97, and by R. Ulichney in "The Void-and-Cluster Method for Dither Array Generation", Proc. SPIE, 1913 (1993), pp. 332–343.

However, such blue noise masks generate dispersed dots. As a consequence, they are not practical for laser printers or xerographic printers where one needs to cluster the black dots to improve both the fidelity and the control of the dot overlaps, and to cluster the white dots to ensure their visibility (at least in the dark areas).

To achieve clustering, one uses a traditional threshold array constructed so that increasing the grey level corresponds to printing larger and larger clusters at a fixed periodicity. This method does not produce unpleasant artifacts, but the number of grey levels that can be represented is often too small, especially when the cluster period is also small. To correct this effect, one usually uses a multicell array, which includes several single-cluster threshold arrays. In a multicell array, several clusters are grown with the same spatial period as in the single-cluster array, but are not grown simultaneously with each other. This allows for additional intermediate grey levels. The order and manner in which the clusters are grown commonly produce unpleasant artifacts at certain grey levels.

Most of these techniques and others are reviewed in the book by R. Ulichney entitled Digital Halftoning, (MIT Press, Cambridge, Mass. 1987), which is a general reference for digital halftoning.

Problem To Be Solved

Typically, a multicell clustered dither array, when tested on all possible levels of uniform greys, will generate both good and less acceptable patterns, depending on the uniform grey level to be rendered and on the physical characteristics of the printer.

SUMMARY OF THE INVENTION

It is therefore an object of the invention to provide a technique which combines the advantages of blue noise and clustering in order to produce a generally acceptable pattern of halftoning as needed, for instance, in laser or xerographic printers.

According to the invention, the multicell clustered dither array patterns of the prior art are replaced by less periodic ones while preserving all benefits of the classical methods. In this way, the invention leaves the nicest patterns unchanged. The invention includes the modification of the dither array to obtain the advantages of blue noise and clustering. The preferred embodiment of the invention provides an automated process of redistributing the locations of the threshold values in the mask that correspond to bad grey levels. This allows us to obtain more pleasant "blueish" effects in the rendering of these grey levels. This invention applies as well to correct bad patterns in any kind of dither mask, including dispersed order dither masks or blue noise masks.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
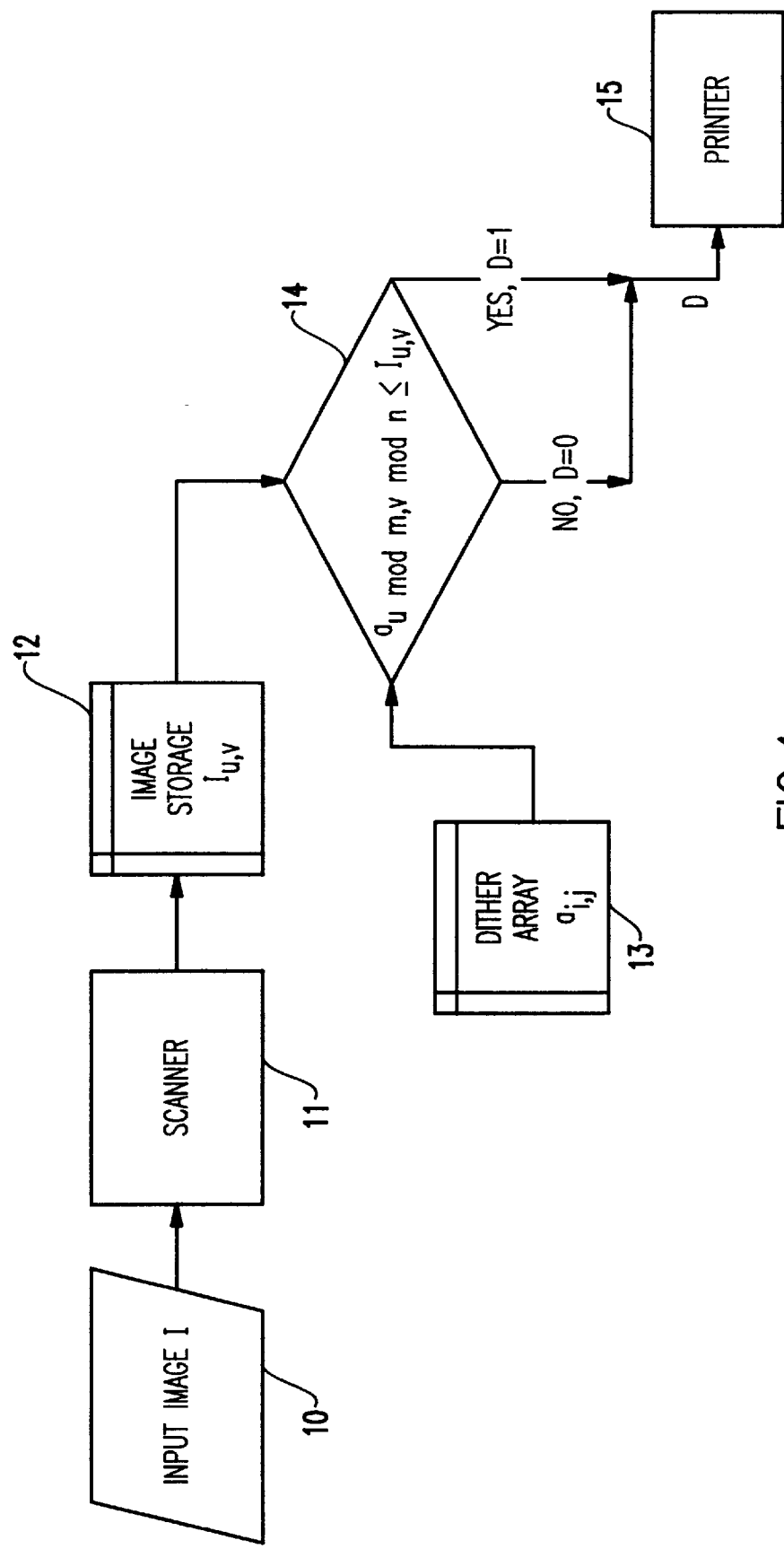
FIG. 1 is a block diagram showing the data flow from input image to the printer according to the present invention.

Referring now to the drawings, and more particularly to FIG. 1, there is shown in block diagram form the data flow from the input image to the printer. More specifically, the input image 10 is scanned by a scanner 11 and stored in image storage 12 as image $I_{u,v}$, where (u,v) is the pixel location. A dither matrix array 13 is used to halftone the image in storage 12.

If L is the number of grey levels to be represented, any m by n matrix $A=(a_{i,j})$ we consider in this description is an array of numbers between 0 and L−1. These numbers represent threshold levels. With reference again to FIG. 1, any dithering algorithm works as follows. Using a dither matrix array 13, the pixel at location (u,v) in image storage 12 will get printed as a black dot (D=1) if and only if the grey level on the image to be printed at location (u,v) is greater or equal to $a_{u',v'}$, where u'=u mod m and v'=v mod n. As usual, c mod d stands for the remainder of the division of c by d. This is determined in the function 14, the output of which is dot print command D to the printer 15.

From the geometric point of view, the dither matrix M will be a m by n rectangular array (where m and n stand for the number of pixels on each side), but (as is usually the case) its construction will be implemented by assuming periodic boundary conditions so that the array can be thought of as being a two dimensional torus. Whenever we speak of the distance between two points in the array or use a related concept, we mean the distance on the torus and not on the rectangle. We will also use the symbol M to designate the array given in the form of a matrix.

Figure 2A:
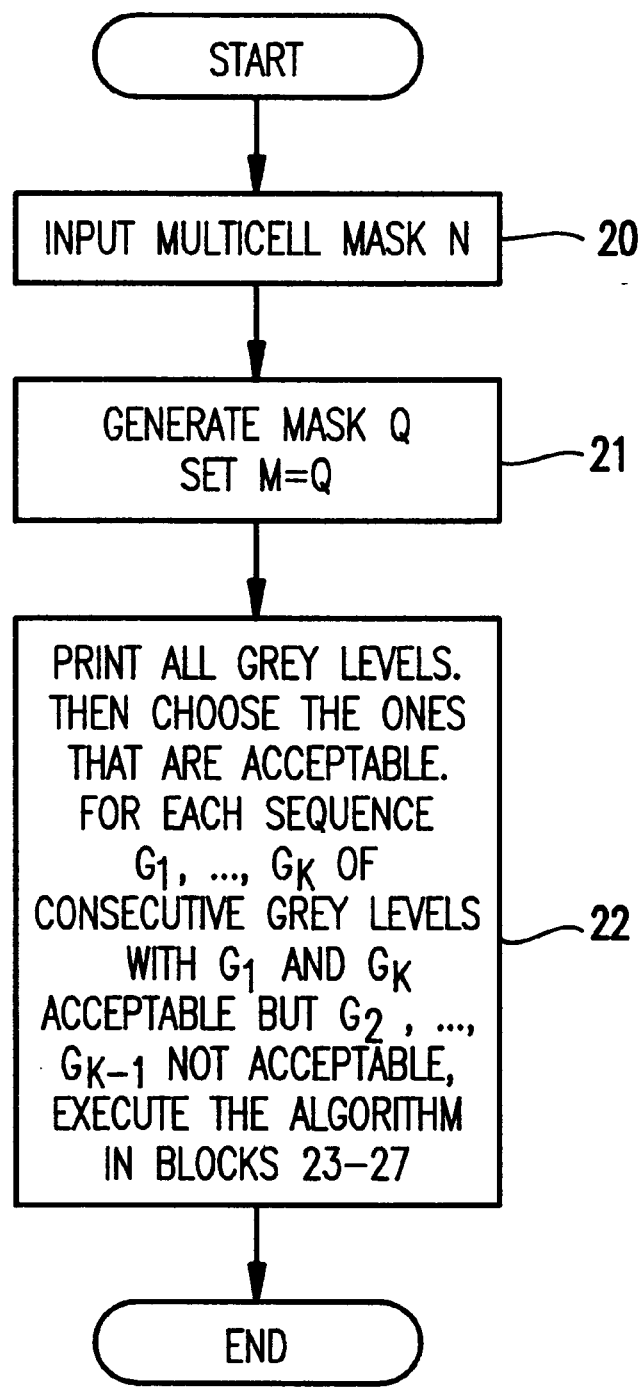
FIGS. 2A and 2B are flow diagrams of the process of modifying a conventional multicell dither array to obtain the advantages of blue noise and clustering.
Figure 2B:
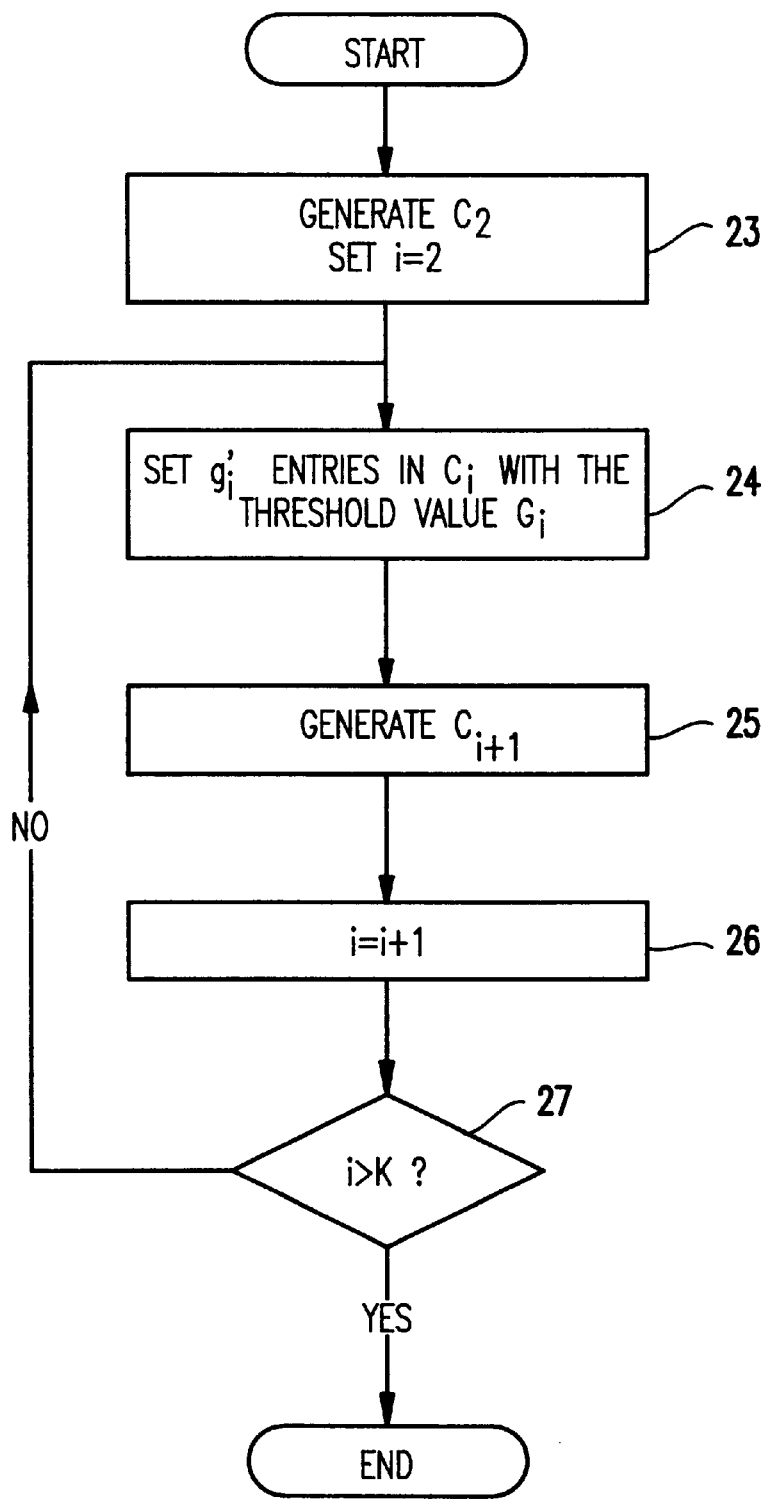

With reference now to FIGS. 2A and 2B, we start from a multicell mask in the form of an $s_1$ by $s_2$ matrix $N=(v_{k,1})$ in function block 20 of FIG. 2A. We then choose two positive integers a and b, and with $m=as_1$, $n=bs_2$, construct first an m by n matrix $Q=(q_{i,j})$ in function block 21, defined by setting $q_{i,j}=v_{i',j'}$, where i'=i mod m and j'=j mod n. The final threshold matrix M is initialized as matrix Q.

In block 22, we determine the grey levels for which matrix Q generates acceptable periodic patterns. For instance, if the criterion of acceptability is esthetics, then this determination is done by examining the printout of all grey levels giver. by the dithering matrix Q (or equivalently matrix N) . The sequence of operations so far described is illustrated by FIG. 2A.

From the determination in function block 22, let $G_1$, $G_2$, . . . , $G_K$ be consecutive grey levels with K>2, such that $G_1$ and $G_K$ are well represented using the matrix N, or equivalently the matrix Q, but that the intermediate grey levels yield unacceptable patterns. With reference now to FIG. 2B, we now show how the entries for halftoning grey levels between grey levels $G_1$ and $G_K$ in the final matrix M are determined.

We call $C_2$ the collection of locations corresponding to threshold values between and including grey levels $G_2$ and $G_K$ in the matrix Q. See function block 23. We call $g_2$ the number of locations in matrix Q corresponding to grey level $G_2$, $g_3$ the number of locations corresponding to grey level $G_3$, and so on. We denote by g the total number of elements of locations in $C_2$, which means that $g=g_2+g_3+ \ldots +g_K$.

We start with index i=2 as determined in function block 23. We choose a number $g_2'$ approximately equal to $g_2$ and change $g_2'$ entries of the matrix M with locations in $C_2$ to the threshold value $G_2$: the entries of matrix M with locations in $C_2$ which are not changed by this operation form a set of entries with a set of locations called $C_3$. The iteration index i is incremented by one in function block 26, and decision block 27 sends the process back to function block 24.

On the next iteration, we choose a number $g_3'$ approximately equal to $g_3$ and change $g_3'$ entries of the matrix M with locations in $C_3$ to the threshold value $G_3$: the entries of M with locations in $C_3$ which are not changed by this operation form a set of entries with a set of locations called $C_4$. The iteration index i is incremented by one in function block 26, and if the index i is greater than K as determined in decision block 27, the process terminates; otherwise, the process goes back to function block 24 for another iteration.

When this process terminates, the collection $C_2$ is exhausted, at which time, even though M has been modified, the matrices M and Q have exactly the same list of locations occupied by threshold values between and including $G_2$ and $G_K$. The $g_i'$'s are chosen such that $g=g_2'+g_3'+ \ldots +g_K'$. Notice that, as a consequence, $C_{K+1}$ equals the empty set. At each step, we changed $g_i'$ entries in the mask M with locations in $C_i$ and defined a set of locations $C_{i+1}$.

The above process (function blocks 23 to 27 of FIG. 2B) is repeated for each such set of $G_1$, $G_2$, . . . , $G_K$ consecutive grey levels with K>2, as determined in function block 22 of FIG. 2A. When all this is done, the dither matrix M will be the final mask to be used in the dithering algorithm shown in FIG. 1.

The way the locations of the threshold values corresponding to undesirable grey levels are distributed can be varied. One can try by hand, or use a more automated method, one of which is described in the preferred embodiment. By implementing our invention, one gets more pleasant "blueish" effects in the rendering of the grey levels for which the original multicell mask generates unwanted periodic representations. Furthermore, the new mask preserves the periodic patterns in the original multicell mask that are desirable.

In the preferred embodiment, we use the following algorithm to determine which $g_i'$ points in the matrix M with indices in $C_i$ will be carrying the threshold value $G_i$ (function block 24 in FIG. 2B)

With $\mathbb{R}$ standing for the set of real numbers, and $\mathbb{R}^2$ standing for the plane parametrized by two coordinates which are real numbers, we chose some function P: $\mathbb{R}^2 \to \mathbb{R}$ with a maximum at the origin and decreasing when moving away from the origin. To simplify the computation, the range R of the potential will be chosen to be finite. The function P is to be interpreted as a potential function. P(x,y) will be chosen to depend only on the distance from (x,y) to the origin, and the distance can be adapted to the particular output device (e.g., printer), standard choices being the Euclidean distance $$\left(\sqrt{x^2 + y^2}\right),$$

$|x|+|y|$ or $\max(|x|, |y|)$. For instance, P can be choosen to be $$e^{\frac{-x^2-y^2}{4.5}},$$

when $|x|$ and $|y|$ are smaller respectively than the horizontal and vertical sizes of the mask, and zero otherwise. Better results are obtained by choosing a potential P which depends on the grey level one works with.

Figure 3:
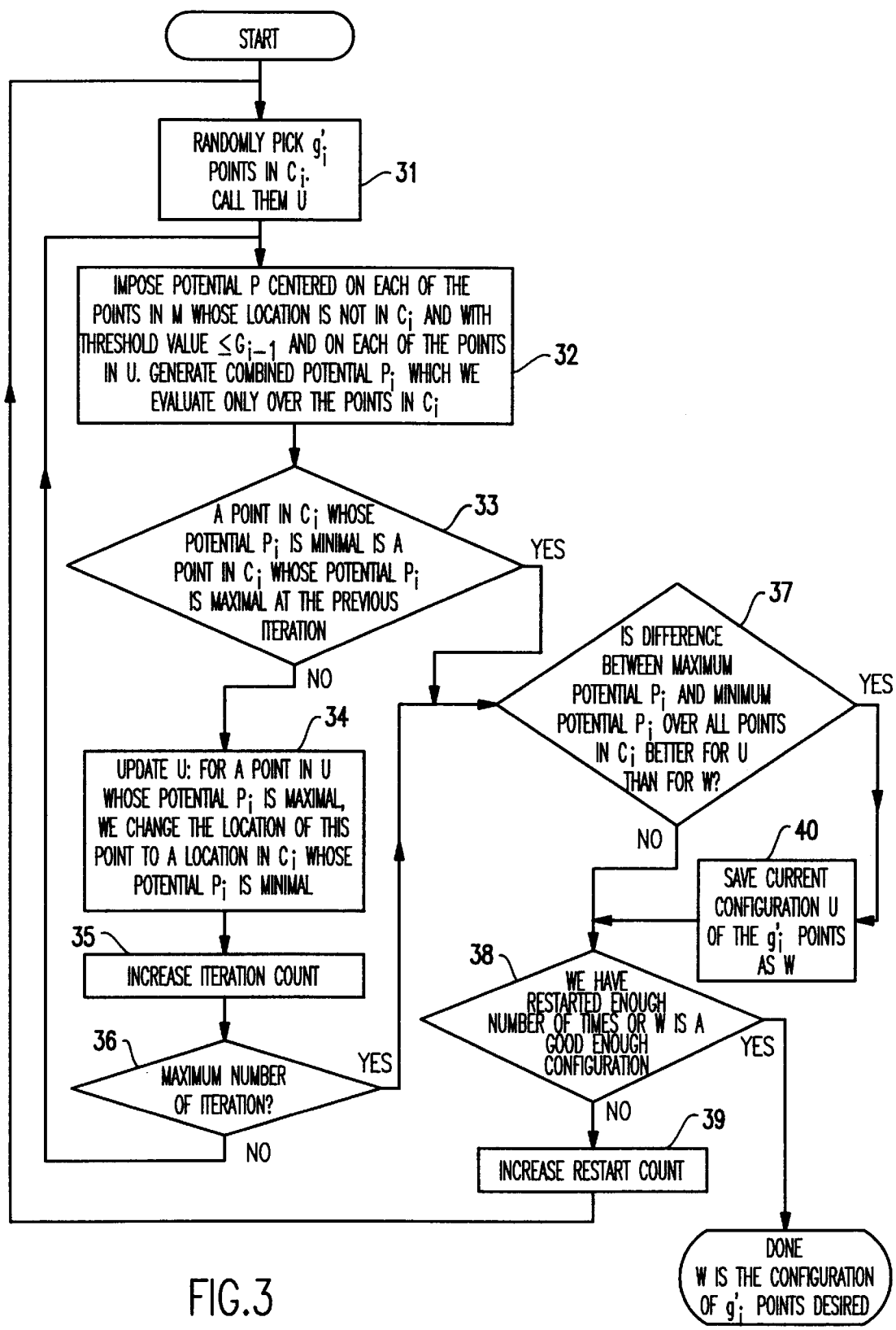
FIG. 3 is a flow diagram of the automated redistribution of the locations of the threshold values corresponding to undesirable grey levels to obtain more pleasant "blueish" effects in the rendering of these grey levels according to the preferred embodiment of the invention.

With reference now to FIG. 3, we first randomly choose in function block 31 $g_i'$ points in matrix Q with locations in $C_i$. The set of these points are called U. In function block 32, we impose a copy, $P_k$, of potential P centered at each of these $g_i'$ initial points in U and at each of the points in matrix M whose location is not in $C_i$ and with threshold value at most $G_{i-1}$. We call $P_i$ the sum of all these local potentials $P_k$. We then evaluate $P_i$ over all points in $C_i$ only.

A test is made in decision block 33 to determine if a point where the potential $P_i$ is minimal is also a point where the potential $P_i$ is maximal at the previous iteration. If so, we jump to function block 37. If not, or if we are at the first iteration, we move one of these $g_i'$ points where the potential $P_i$ is maximal to a point with locations in $C_i$ where the potential $P_i$ is minimal, in function block 34. The iteration count is increased by one in function block 35, and then a test is made in decision block 36 to determine if the iteration count is a predetermined maximum value. If not, the process loops back to function block 32, and the potential $P_i$ is updated with the $g_i'$ points in the new locations. This process is repeated until either a predetermined maximum number of iterations is reached as determined in decision block 36, or the point with locations in $C_i$ having the minimal potential is a point with the maximal potential in the previous iteration as determined in decision block 33, whichever comes first.

A test is then made in decision block 37 to determine if the difference between the maximum potential of $P_i$ and minimum potential of $P_i$ over all points in $C_i$ is better than before (better could mean, for instance, smaller). If yes (or if this is the first iteration), the final configuration U is saved in W in function block 40 and the process jumps to decision block 38. Otherwise, a further test is made in decision block 38 to determine if we have restarted a predetermined maximum number of times or if W is a good enough configuration. For instance, W is a good configuration if the difference between the maximum potential of $P_i$ and minimum potential of $P_i$ over all points in $C_i$ is small. If this test evaluates to "no", the restart counter is incremented in function block 39, and this process is then restarted at function block 31 with a new random set of $g_i'$ initial points. If the test in block 38 evaluates to "yes", we stop. At this point W is the configuration of the $g_i'$ points desired.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method to produce a halftone dither threshold array to correct undesirable patterns generated by multicell dither threshold arrays comprising the steps of:

generating a multicell dither array;

determining a set of good halftone patterns occurring in said dither array; and redistributing locations of threshold values under the constraint that a resulting threshold mask preserves said good halftone patterns by redistributing only locations which are in one pattern out of a set of two consecutive good halftone patterns.

2. A method to produce a halftone dither threshold array as recited in claim 1 wherein said dither threshold array is used to halftone an image by determining for each pixel location of the image whether to print a black dot.

3. A method to correct undesirable patterns generated by multicell dispersed dither threshold arrays which combines advantages of blue noise and good dispersed periodic patterns in order to produce a dither mask which generates halftone patterns comprising the steps of:

generating a multicell dispersed dither array;

determining a set of good dispersed periodic patterns occurring in said dither array;

redistributing locations of threshold values between said good dispersed periodic patterns to obtain pleasant blue noise-like effects under the constraint that the resulting threshold mask preserves said good dispersed periodic patterns thereby obtaining advantages of blue noise and dispersed periodic patterns; and using the generated dither array to determine for each pixel location in image storage whether to print a black dot.

4. A method to correct undesirable patterns generated by threshold arrays which combine the advantages of blue noise, good dispersed periodic patterns and good clustered patterns in order to produce a dither mask which generates halftone patterns comprising the steps of:

generating a threshold array;

determining a set of good patterns comprising clustered patterns and dispersed periodic patterns;

redistributing locations of threshold values between said good patterns to obtain pleasant blue noise-like effects under the constraint that the resulting threshold mask preserves said good patterns thereby obtaining advantages of blue noise, dispersed periodic patterns and clustered patterns; and using the generated dither mask to determine for each pixel location in image storage whether to print a black dot.

5. The method to correct undesirable patterns generated by multicell clustered dither threshold arrays recited in claim 4 wherein the generated multicell clustered dither array pattern is aperiodic.

6. The method to correct undesirable patterns generated by multicell clustered dither threshold arrays recited in claim 4 wherein a black dot is printed by a laser or xerographic printer.

7. A method to correct undesirable patterns generated by multicell clustered dither threshold arrays which combines the advantages of blue noise and good clustered patterns in order to produce a dither mask which generates halftone patterns comprising the steps of:

generating a multicell clustered dither array;

determining a set of good clustered patterns occurring in said dither array;

redistributing locations of threshold values between said good clustered patterns to obtain pleasant blue noise-like effects under the constraint that the resulting threshold mask preserves said good clustered patterns thereby obtaining advantages of blue noise and clustered patterns; and using the generated dither array to determine for each pixel location in image storage whether to print a black dot.

8. A method to correct undesirable patterns generated by multicell clustered dither threshold arrays which combines the advantages of blue noise and clustering in order to produce a dither mask which generates generally acceptable halftone patterns comprising the steps of:

generating a multicell clustered dither array pattern by redistributing locations of threshold values corresponding to undesirable grey levels to obtain more pleasant "blueish" effects in rendering of the grey levels;

leaving desirable halftone patterns unchanged; and using the generated dither array to determine for each pixel location in image storage whether to print a black dot, wherein the step of generating a multicell clustered dither array pattern comprises the steps of:

inputting a multicell mask in the form of an $s_1$ by $s_2$ matrix $N=(v_{k,1})$;

choosing two positive integers a and b, and with $m=as_1$, $n=bs_2$, constructing first an m by n dithering matrix $Q=(q_{i,j})$ defined by setting $q_{i,j}=v_{i',j'}$, where $i'=i \bmod m$ and $j'=j \bmod n$; and initializing a final threshold matrix M as the dithering matrix Q.

9. The method to correct undesirable patterns generated by multicell clustered dither threshold arrays recited in claim 8 further comprising the step of determining grey levels for which the dithering matrix Q generates acceptable periodic patterns.

10. The method to correct undesirable patterns generated by multicell clustered dither threshold arrays recited in claim 9 wherein the step of determining grey levels for which the dithering matrix Q generates acceptable periodic patterns is done by examining a printout of all grey levels generated by the dithering matrix Q where the criterion of acceptability is esthetics.

11. The method to correct undesirable patterns generated by multicell clustered dither threshold arrays recited in claim 10 further comprising the steps of:

generating $C_2$ as a collection of locations corresponding to threshold values between and including grey levels $G_2$ and $G_K$ in the matrix Q, where $G_1, G_2, \ldots, G_K$ are consecutive grey levels with K>2;

defining $g_2$ as a number of locations in matrix Q corresponding to grey level $G_2$, $g_3$ as a number of locations corresponding to grey level $G_3$, and so on, and denoting by g a total number of elements of $C_2$, which means that $g=g_2+g_3+ \ldots +g_K$;

choosing a number $g_2'$ approximately equal to $g_2$ and changing $g_2'$ entries of the matrix M with locations in $C_2$ to the threshold value $G_2$, entries of matrix M with locations in $C_2$ which are not changed by this operation forming a set of entries with a set of locations called $C_3$;

incrementing an index i;

choosing a number $g_3'$ approximately equal to $g_3$ and changing $g_3'$ entries of the matrix M with locations in $C_3$ to the threshold value $G_3$, entries of matrix M with locations in $C_3$ not changed by this operation form a set of entries with a set of locations called $C_4$;

incrementing the index and determining if the index is greater than a predetermined value K and, if so, terminating the process; but otherwise, iterating the steps of choosing and incrementing for K−3 additional steps, until the collection $C_2$ is exhausted, at which time, even though matrix M has been modified, the matrices M and Q have exactly a same list of locations occupied by threshold values between and including grey levels $G_2$ and $G_K$.

12. The method to correct undesirable patterns generated by multicell clustered dither threshold arrays recited in claim 11 wherein the step choosing $g_i'$ entries in $C_i$ comprises the steps of:

randomly choosing $g_i'$ points in matrix Q with locations in $C_i$, a set of these points being called U;

imposing a copy, $P_k$, of potential P centered at each of these $g_i'$ initial points in U and at each of the points in matrix M whose location is not in $C_i$ and with threshold value at most $G_{i-1}$, the sum of all local potentials $P_k$ being $P_i$;

evaluating $P_i$ over all points in $C_i$ only and determining if a point where the potential $P_i$ is minimal is also a point where the potential $P_i$ is maximal at the previous iteration and, if not, moving one of the $g_i'$ points where the potential $P_i$ is maximal to a point with locations in $C_i$ where the potential $P_i$ is minimal; and determining if a maximum number of iterations have been made and, if not, updating the potential $P_i$ with the $g_i'$ points in new locations and repeating this process until either a predetermined maximum number of iterations is reached or the point with locations in $C_i$ having the minimal potential is a point with the maximal potential in a previous iteration, whichever comes first.

13. The method to correct undesirable patterns generated by multicell clustered dither threshold arrays recited in claim 12 wherein the process is repeated with a new random set of $g_i'$ points with locations in $C_i$.

14. The method to correct undesirable patterns generated by multicell clustered dither threshold arrays recited in claim 13 further comprising the step of determining if a difference between the maximum potential $P_i$ and minimum potential $P_i$ over all points in $C_i$ is better than before, and if not, repeating the process with a new random set of $g_i'$ initial points with locations in $C_i$ until a set of $g_i'$ points with locations in $C_i$ is found such that, in this set, the maximal and minimal values of $P_i$ are close to each other.

15. A method to generate a threshold array having any number of predetermined grey level patterns greater than two which are consistent with patterns within the same threshold array, whereby remaining grey level patterns are generated by the method comprising the steps of:

for every two consecutive predetermined grey level patterns $P_1$ and $P_2$, where $P_1$ has less dots than $P_2$, determining the set C of locations which are different in the two patterns;

determining the number, n, of grey levels separating the two patterns; and partitioning C into n disjoint sets, $C_1, \ldots, C_n$, such that:

a) a pattern obtained by adding dots at locations $C_1$ to pattern $P_1$, the pattern obtained by adding dots at locations $C_1$ and $C_2$ to pattern $P_1$, and the pattern obtained by adding dots at locations $C_1, \ldots, C_n$ to pattern $P_1$ are all pleasant patterns; and b) a pattern obtained by adding dots at locations $C_1$ to pattern $P_1$ represents one gray level above $P_1$, the pattern obtained by adding dots at locations $C_1$ and $C_2$ to pattern $P_1$ represents two gray levels above $P_1$, and the pattern obtained by adding dots at locations $C_1, \ldots, C_n$ to pattern $P_1$ represents n−1 grey levels above $P_1$.

* * * * *